US008775653B2

(12) United States Patent
Lee et al.

(10) Patent No.: US 8,775,653 B2
(45) Date of Patent: *Jul. 8, 2014

(54) WEB CLIENT DATA CONVERSION FOR SYNTHETIC ENVIRONMENT INTERACTION

(75) Inventors: Robert E. Lee, Austin, TX (US); Jon E. Van Caneghem, Menlo Park, CA (US); Bryan J. Farina, Playa Vista, CA (US); Peter C. Huang, Irvine, CA (US); Erin Turner, San Francisco, CA (US)

(73) Assignee: Trion Worlds, Inc., Redwood City, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 13/479,169

(22) Filed: May 23, 2012

(65) Prior Publication Data
US 2012/0295716 A1 Nov. 22, 2012

Related U.S. Application Data

(63) Continuation of application No. 12/791,773, filed on Jun. 1, 2010, now Pat. No. 8,214,515.

(60) Provisional application No. 61/183,038, filed on Jun. 1, 2009.

(51) Int. Cl.
*G06F 15/16* (2006.01)
*H04L 29/06* (2006.01)

(52) U.S. Cl.
CPC ..................................... *H04L 69/08* (2013.01)
USPC .......................................... 709/230; 709/246

(58) Field of Classification Search
CPC ....................................................... H04L 69/08
USPC .................................................. 709/230, 246
See application file for complete search history.

(56) References Cited

U.S. PATENT DOCUMENTS 5,819,034 A  10/1998  Joseph et al.
5,915,090 A  6/1999  Joseph et al.
(Continued)

FOREIGN PATENT DOCUMENTS

EP    0680182    11/1995
RU    2236702    9/2004

OTHER PUBLICATIONS

Kuester et al., Virtual Explorer: A Plugin-Based Virtual Reality Framework, SPIE Proceedings, The International Society for Optical Engineering, vol. 4297, Jan. 22, 2001.

*Primary Examiner* — Mohamed Wasel
(74) *Attorney, Agent, or Firm* — Van Pelt, Yi & James LLP

(57) ABSTRACT

Web client data conversion for synthetic environment interaction is described, including receiving a message at a synthetic environment server indicating occurrence of an event on a web client by a web application server configured to generate a transformed message from a first protocol format to a second protocol format, sending the transformed message from the web application server to a message bus using the second protocol format, translating the transformed message into a translated message, the transformed message being translated from the second protocol to a third protocol using a property class, sending the translated message from the message bus to the synthetic environment server according to the property class, and updating the synthetic environment using data included in the translated message, wherein the synthetic environment is updated in substantially real-time. In some embodiments, a method can include an implementing an application programming interface associated with a transactional server.

29 Claims, 18 Drawing Sheets

(56) References Cited

U.S. PATENT DOCUMENTS

| | | | |
|---|---|---|---|
| 6,751,212 B1 * | 6/2004 | Kaji et al. | 370/352 |
| 8,026,918 B1 | 9/2011 | Murphy | |
| 2004/0076178 A1 * | 4/2004 | Botton | 370/466 |
| 2005/0068167 A1 | 3/2005 | Boyer et al. | |
| 2006/0274784 A1 | 12/2006 | Hsueh et al. | |
| 2009/0006566 A1 | 1/2009 | Veeramachaneni et al. | |
| 2009/0017916 A1 | 1/2009 | Blanchard et al. | |
| 2009/0055369 A1 | 2/2009 | Phillips et al. | |
| 2009/0231112 A1 * | 9/2009 | Baalbergen et al. | 340/286.02 |
| 2009/0235176 A1 | 9/2009 | Jayanthi | |
| 2009/0253494 A1 | 10/2009 | Fitch et al. | |
| 2009/0300525 A1 | 12/2009 | Jolliff et al. | |
| 2010/0041481 A1 | 2/2010 | Smedley et al. | |
| 2010/0251330 A1 * | 9/2010 | Kroeselberg et al. | 726/3 |
| 2010/0274914 A1 * | 10/2010 | Birch et al. | 709/230 |
| 2011/0041153 A1 | 2/2011 | Simon et al. | |
| 2012/0079046 A1 | 3/2012 | Murphy | |
| 2012/0084364 A1 | 4/2012 | Sivavakeesar | |
| 2013/0133087 A1 | 5/2013 | Proctor et al. | |

* cited by examiner

WEB CLIENT DATA CONVERSION FOR SYNTHETIC ENVIRONMENT INTERACTION

CROSS REFERENCE TO RELATED APPLICATIONS

This application is a continuation of U.S. patent application Ser. No. 12/791,773, now U.S. Pat. No. 8,214,515 entitled WEB CLIENT DATA CONVERSION FOR SYNTHETIC ENVIRONMENT INTERACTION filed Jun. 1, 2010 which is incorporated herein by reference for all purposes, which claims priority to U.S. Provisional Application No. 61/183,038 entitled WEB CLIENT DATA CONVERSION FOR SYNTHETIC ENVIRONMENT INTERACTION filed Jun. 1, 2009 which is incorporated herein by reference for all purposes.

FIELD

The present invention relates generally to software, computer program architecture, and data network communications. More specifically, techniques for web client data conversion for synthetic environment interaction are described.

BACKGROUND

Conventional video games, online video games, personal computer (i.e., PC) games, console games, and handheld or mobile games (i.e., "gaming") are becoming increasingly prolific in titles, distribution, and revenues. Increasing available bandwidth due to faster network connection speeds and computing resources are enabling the development of more sophisticated games with technically complex and diverse functions. In some conventional games, virtual worlds or artificially created and rendered environments are created to allow games, players, or users ("users") to interact with each other and virtual environments. Typically, personal computers are used for interaction with a virtual environment given increasing computer processor and storage resources. In other conventional examples, mobile, personal, or handheld devices are also allowing users to interact with virtual environments. However, conventional solutions for interacting with a virtual environment are problematic.

Using conventional solutions, access to a virtual environment is often slow. In some conventional solutions, substantial delays are incurred during game play or interaction, which reduces the consumer and commercial appeal of computer software, programs, or applications (i.e., "applications"), resulting in lowered revenues and success in individual titles, games, and platforms. Further, the gaming industry is highly cyclical and competitive, which results in many unsuccessful conventional gaming solutions. Online game such as massively multiplayer online games (i.e., MMOG) often depend upon the acquisition of user subscriptions in order to generate revenue. However, if a conventional game is slow, not real-time, or unable to use existing computing resources and bandwidth, users will not engage and buy or subscribe to a given title.

In conventional gaming, extension of game features and functions to encompass web-based (i.e., World Wide Web-based data communication using hyper text transfer protocol (HTTP)) interactivity are often included. However, conventional web-based interactivity is very limited, slow, and not real-time in game play. In some conventional examples, users are able to perform limited functions over the web such as reviewing a game character inventory, characteristics, features, or attributes. Other conventional solutions enable users to review or update information associated with his account. Further, conventional. MMO solutions enable game play, but not in real-time.

In short, conventional solutions enabling web-based gaming interaction are limited, unappealing, and unsuccessful. Conventional web-based interaction in gaining is very limited in features and functions. Conventional solutions do not allow for web-based interaction that results in interactive game play and the use of cached data while "offline" (i.e., not connected) results in a substantially reduced user experience.

Typically, conventional solutions rely upon the use of synchronous data communication techniques that implement client-based requests and server-generated responses. Web-based client requests for data are often answered slowly with responsive data being retrieved from a networked storage facility or server. Further, conventional solutions for establishing persistent data communication links between a web-based client and a game server have not been successfully implemented in web browsers using document object model (DOM), persistent connection protocols such as user datagram protocol (UDP). Transmission of data in conventional solutions using UDP is problematic since lost packets, errors, and other detriments are not detected as transmission of data between a client and a server are sent without error correction or checking, which results in game play errors. Still further, web-based data communication protocols such as transmission control protocol/Internet protocol (TCP/IP) require substantial processor resources for performing protocol-based functions such as error checking, checksum calculation, and correction, typically requiring high bandwidth, resulting in slow game play (i.e. processing). In other words, transmission of data in conventional solutions using TCP/IP uses error correction techniques such as checksums, but is processor-intensive and can command resources such that a server may be slowed substantially, causing latencies and slow game play. Conventional solutions have not successfully implemented asynchronous data communication techniques between web-based game clients and game servers due to low bandwidth capacities. In other words, the increasing features, functionality, and user experiences (e.g., look-and-feel of virtual worlds due to enhanced graphics and rendering technologies) in gaming require high bandwidth capabilities that exceed those available from existing web-based clients and devices.

Thus, what is needed is a solution for web-based gaming or virtual world interaction without the limitations of conventional techniques.

BRIEF DESCRIPTION OF THE DRAWINGS

Various embodiments of the invention are disclosed in the following detailed description and the accompanying drawings.

DETAILED DESCRIPTION

Figure 1:
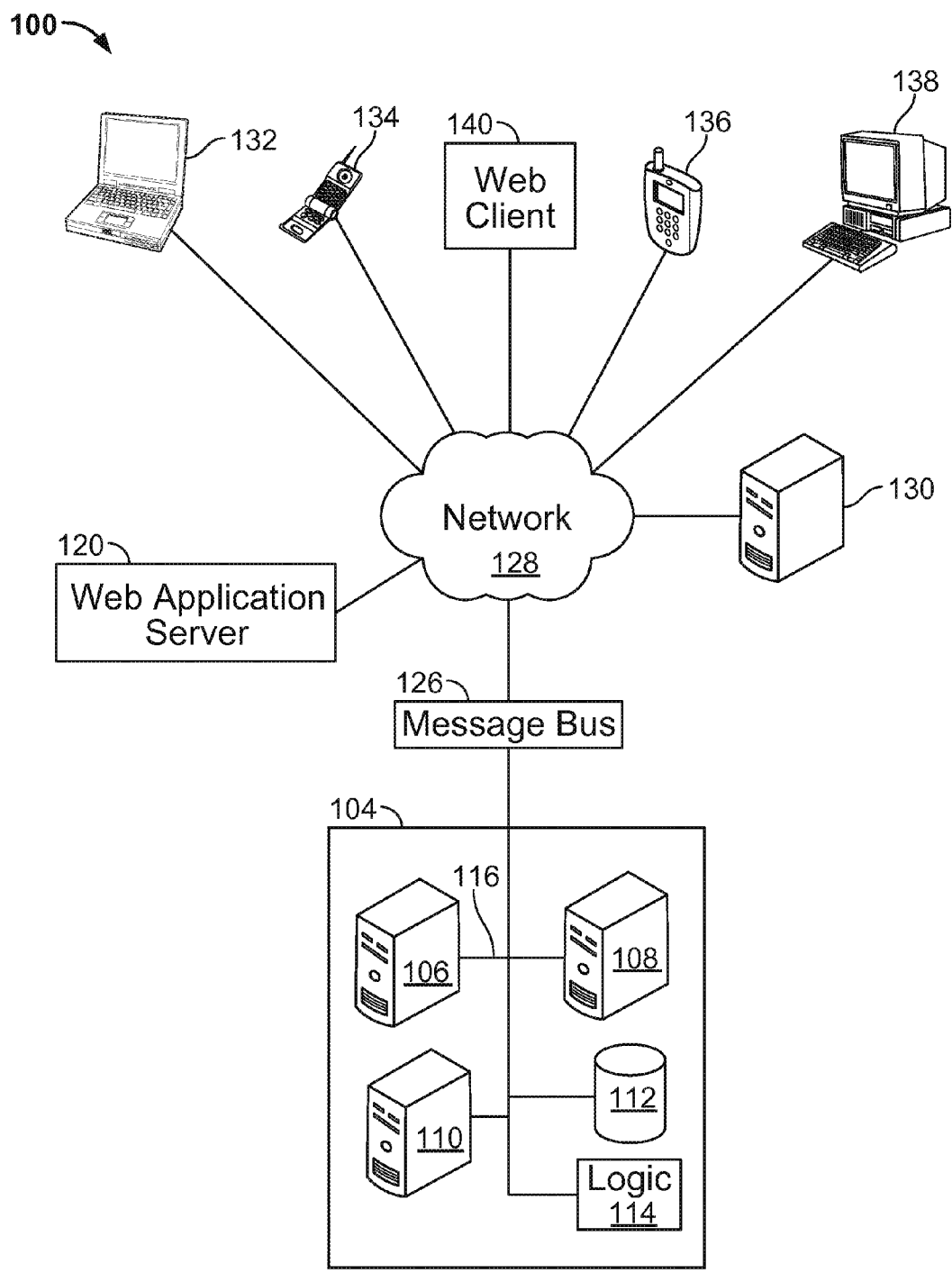
FIG. 1 illustrates an exemplary system for web client data conversion for synthetic environment interaction.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Design, publishing, and other types of applications such as Dreamweaver®, Shockwave®, Flash®, Drupal and Fireworks® may also be used to implement the described techniques. The described techniques may be varied and are not limited to the examples or descriptions provided.

Techniques for web client data conversion for synthetic environment interaction are described. For descriptive purposes that follow, "synthetic environment" may refer to both a topology as well as a virtual environment (i.e., world) that is created as a result of processes performing within the computing environment associated with the synthetic environment. In some examples, a web application server and game (i.e., synthetic environment) communicate using a message bus' native data communication protocols (e.g., JMS, OpenWire, and others). Any conversion of native web or native game protocols may occur at various points in a network topology, as described below. As an example, a web application server may be configured to send and receive messages associated with a game event (as described below) through a message bus. Conversely, a game environment may send and receive messages associated with a web event (as described below) using message bus. A web application server may be configured to handle protocol conversion between a web client and a web application server. In other examples, a message bus may be omitted, instead providing data communication between a web application server and a synthetic environment server. For example, a web application server may be configured to emulate a game client and communicate with game servers via native game protocols. A web application server may be configured to establish a persistent TCP or UDP connection and send/receive messages due to emulation of a game client. In still other examples, blocking requests from web clients to a synthetic environment and associated game databases may be implemented. Game data may be maintained, simulated in memory, and persisted to a game database that is configured to provide data communication between a web environment and a synthetic environment using an application server with transactional API's built on top of a game database(s). Stale, simulated game data may be refreshed (i.e., updated) periodically and data associated with web events may be written into a game. The described techniques may be varied in design, function, implementation, order, configuration, layout, format, or other technical aspects and are not limited to the examples provided.

FIG. 1 illustrates an exemplary system for web client data conversion for synthetic environment interaction. Here, system 100 includes game environment 104, game (i.e., synthetic environment) servers 106-110, game database 112, logic 114, web application server 120, message bus 126, network 128, web clients 130-140. The number, type, configuration, or other aspects of the above-listed elements may be varied and the examples shown are for purposes of illustration. For example, web client 140 may be implemented using any type of client that is configured for interaction with game environment 104 using any type of data communication protocol for the World Wide Web (i.e., web). Types of web clients may include laptops (e.g., web client 132), servers (web client 130), mobile (e.g., cell) phones (e.g., web client 134), smart phones or handheld computing and/or communication devices (web client 136), personal computer (PC) (web client 138), or others. Examples of other types of web clients may include game consoles (Xbox® from Microsoft® Corporation of Redmond, Wash., Wii® from Nintendo® Corporation, PlayStation® from Sony®, and others), set top television boxes, handheld game devices (e.g., PSP® from Sony®, DS Lite® from Nintendo®), and others.

The quantity and configuration of elements shown are provided for purposes of illustration and are not limited to the configurations shown. For example, message bus 126 may be directly, indirectly, or network-connected to game environment 104. In other words, an intervening data network may be disposed or otherwise configured between message bus 126 and game environment 104 and between message bus 126 and web clients 130-140. As another example, network 128 may be implemented using one or more networks using different types or topologies of networks. For example, network 128 may be implemented using any type of data communication network such as the Internet, a local area network (LAN), wide area network (WAN), municipal area network (MAN), public, private, wireless, wired, or others, without limitation.

As shown, game environment 104 may be implemented with one or more game servers (e.g., game servers 106-110) that are configured to render a virtual world or synthetic environment (hereafter "synthetic environment) using techniques such as those described in U.S. patent application Ser. No. 11/715,009, entitled "Distributed Network Architecture for Introducing Dynamic Content into a Synthetic Environment," filed Sep. 6, 2007, which is herein incorporated by reference for all purposes. In some examples, game database 112 may also be implemented using one or more data storage facilities such as data bases, data warehouses, data marts, storage area networks, redundant arrays of independent disks, or others, without limitation. Homogeneous or heterogeneous storage facilities, types, or schemas may be used, again, without limitation. Logic 114, in some examples, may be configured to provide control signals and data to manage game environment 104. In other examples, game clients (not shown) may also be included with game environment 104. As described herein, game environment 104 may be used to instantiate, generate, render, display, or perform other functions associated with a synthetic environment. In some examples, synthetic environments may be implemented using shards (i.e., individual instances of a synthetic environment that are implemented using one or more assigned resources (e.g., servers)) or shardless. Here, massively multiplayer online games (MMOGs) such as massively multiplayer online real time strategy (MMORTS), massively multiplayer online first person shooter (MMOFPS), massively multiplayer online sports (MMORS), and others, without limitation, may be implemented for web-based client interaction, without limitation. As used herein, "client" may refer to any type of application that is implemented using hardware, software, circuitry, or a combination thereof configured for interaction with game environment 104.

In some examples, message bus 126 may be implemented to translate, transform, evaluate, or to perform other functions associated with data being exchange between web clients 130-140, web application server 120, and game environment 104. In order to implement real-time or substantially real-time interactivity, message bus 126, as described in greater detail below, uses a property class system of objects that may be instantiated using specifications that determine attributes associated with a given object. Property class objects are also described in greater detail in U.S. patent application Ser. No. 11/715,009, which is herein incorporated by reference for all purposes. Here, message bus 126 is configured to process data being communicated between game environment 104, game servers 106-108 and web clients 130-140 by translating data from web protocols (HTTP, persistent HTTP, and others) to server-side data communication protocols (e.g., UDP, TCP, IP, and others). As mentioned above, message bus 126 and various implementation examples are described in greater detail below. In still other examples, system 100 and the above-described elements may be implemented differently and are not limited to the descriptions shown or provided above.

Figure 2:
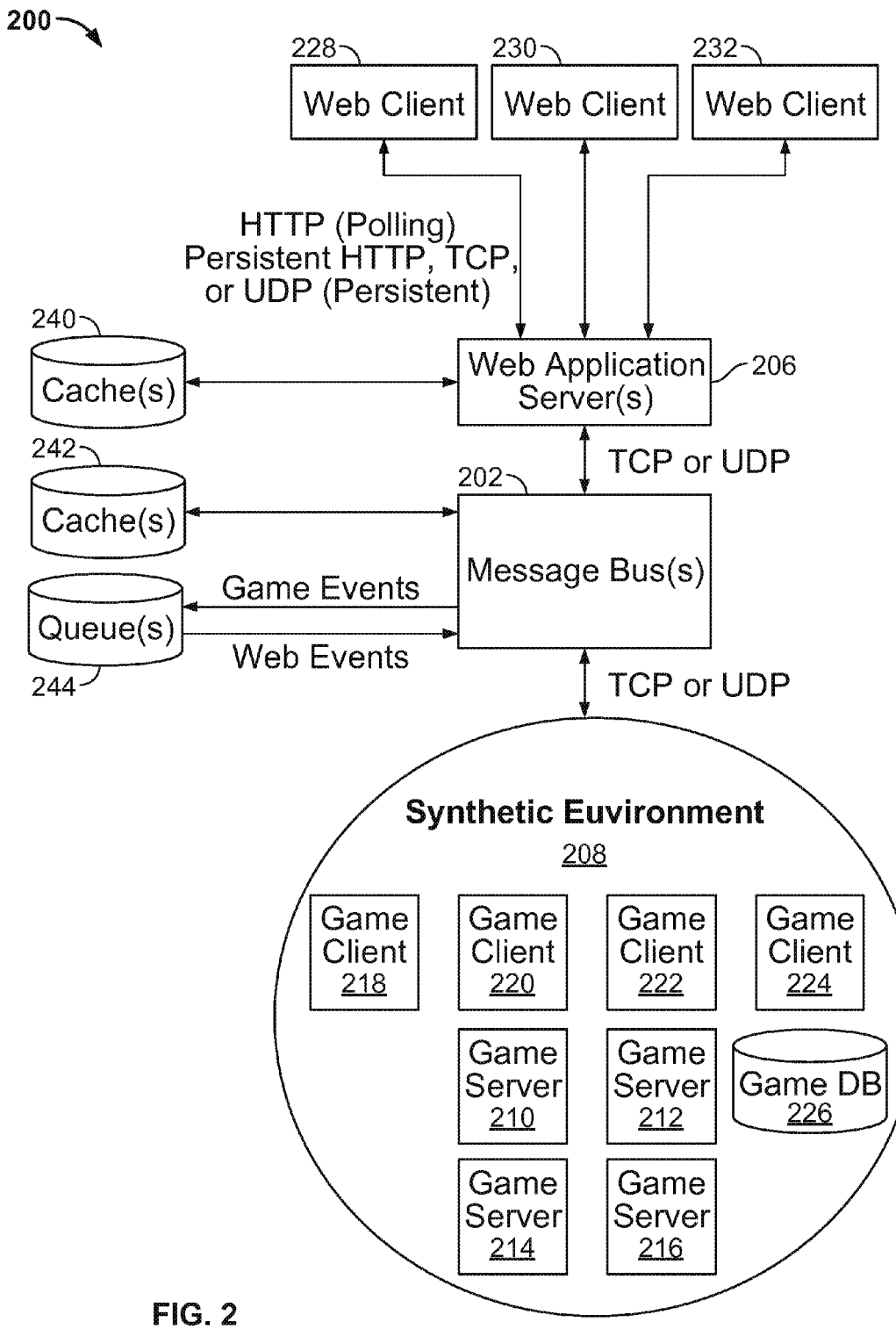
FIG. 2 is an alternative illustration of an exemplary system for web client data conversion for synthetic environment interaction.

FIG. 2 is an alternative illustration of an exemplary system for web client data conversion for synthetic environment interaction. Here, system 200 includes message bus 202, web application server 206, synthetic environment 208, game servers 210-216, game clients 218-224, game database 226, web clients 228-232, caches 240-242, and queue 244. The number, type, configuration, or other aspects of the above-listed elements may be varied and the examples shown are for purposes of illustration. Fewer, more, or different elements may be implemented. For example, fewer or more game clients may be shown apart from game clients 218-224. Likewise, fewer or more game servers apart from game servers 210-216 may be implemented. As another example, a single or multiple message buses may be implemented for message bus 202. Still further, one or more web application servers 206 may also be implemented. As used herein, a web application server may refer, in some examples, to a server implemented using hardware, software, circuitry, or a combination thereof, to instantiate processes that are designed, coded, and configured to applications that are delivered (i.e., rendered, displayed, and run from within) in a web browser (hereafter "web application" or "webapp"). In some examples, "synthetic environment" may be used to described any type of virtual world, game environment, or artificial environment created, for example, use with MMOGs such as those described herein, using the techniques described herein and in U.S. patent application Ser. No. 11/715,009, as incorporated above.

Here, events occurring in synthetic environment may be initiated from several sources, including game clients 218-224, web clients 228-232, game servers 210-216, or others. In some examples, an event occurring within synthetic environment 208 (e.g., a character is killed, a weapon is purchased, a battle commences, an auction occurs, and others without limitation), data may be sent from game environment 208 by one or more of game servers 210-216 to message bus 202. If connected (i.e., a data network connection exists between game environment 206 and a web environment (i.e., web application server 206 and web clients 228-232)), message bus 202 translates or transforms ("translate" and "transform" may be used interchangeably as described herein) a message (i.e., an encapsulation of data that is formatted based on one or more data communication protocols (e.g., HTTP, TCP, IP, UDP, and others)) for further processing by web application server 206. When received and processed by web application server 206, the message is formatted for delivery to a web client for delivery (i.e., rendering, instantiation, or the like) within a web browser, regardless of the end physical device on which the web browser is installed. Alternatively, if a data communication link or connection is not present between message bus 202 and synthetic environment 208, data may be queued in game database 226 until the connection is restored.

Further, if data from one or more of web clients 228-232 is sent to synthetic environment 208, but a data communication link between message bus 202 and synthetic environment 208 is broken, down, or otherwise not available; then data may be stored in queue 244 until the link is restored. Once restored, data may be translated or transformed by message bus 202 and transmitted to synthetic environment 208 for write operations to be performed on game database 226, which may be implemented using any type of data storage facility or technology. Likewise, in order to maintain interactive features and functions if a data communication link between message bus 202 and synthetic environment 208 is unavailable, game data may be stored in caches 240-242. In other words, if users are employing web clients 228-232 to request data from (i.e., perform a read operation) synthetic environment 208 and a data communication link becomes unavailable (i.e., between message bus 202 and synthetic environment 208), data may be read instead from caches 240 and/or 242. In other examples, events occurring within a synthetic environment (i.e., game events) may result in "pushing" or sending data from synthetic environment 208 to one or more of game clients 228-232. Conversely, write operations from web clients to synthetic environment 208 (e.g., a user on a web client indicates a movement of her character within synthetic environment 208 or causes a "web event") may be performed to queue 244. In some examples, input or data from web clients 228-232 for a write operation to game data (i.e., data stored in game database 226) may be temporarily stored in queue 244 until a data communication link between message bus 202 is re-opened with synthetic environment 208. Further, game data may be stored on cache 242 to enable features and functionality for users of web clients 228-232 to continue to interact with an instance of synthetic environment 208 even though the latter may not be available due to a network connectivity problem. When a network connectivity problem is resolved and a data communication link is restored, data stored in queue 244 for write operations are written to game data base 226 by sending translated or transformed messages from message bus 202 to synthetic environment 208 and one or more of game servers 210-216. In some examples, game servers 210-216 may also be referred to as "synthetic environmental servers" or "synthetic environment servers."

As shown, data transferred, exchanged, transmitted, received, or otherwise between message bus 202 and synthetic environment 208 are formatted according to data communication protocols such as TCP or UDP. Likewise, data exchanged between message bus 202 and web application server 206 may be similarly formatted using TCP or UDP. However, data exchanged between web application server 206 and web clients 228-232 may be formatted according to data communication protocols suitable for rendering and displaying content in web browsers (e.g., HTTP, persistent HTTP, or others). Other types of protocol may be used apart from those shown and described. In other examples, system 200 and the above-described elements may be varied and are not limited to the descriptions provided.

Figure 3A:
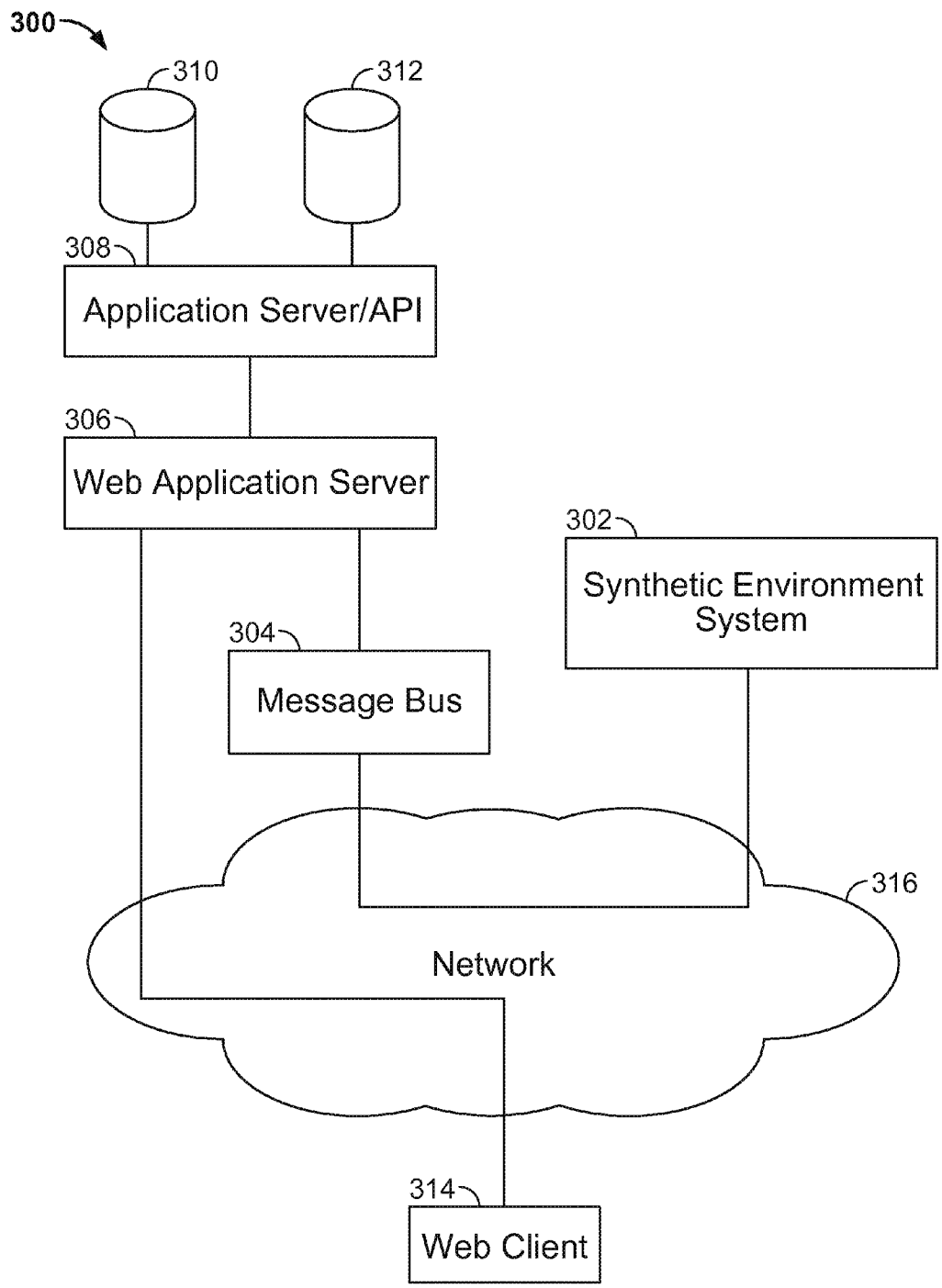
FIG. 3A illustrates an exemplary network topology for web client data conversion for synthetic environment interaction system.

FIG. 3A illustrates an exemplary network topology for web client data conversion for synthetic environment interaction system. Here, topology 300 includes synthetic environment system 302, message bus 304, web application server 306, application server/APIs 308, databases 310-312, web client 314, and network 316. In some examples, topology 300 may be implemented to enable continuous real-time or substantially real-time game play within a synthetic environment by using message bus 304 to translate messages (i.e., data) between game protocols (e.g., property class, as described herein) and persistent connection protocols (e.g., persistent HTTP, TCP, UDP, or others) and web-based or web protocols (e.g., HTTP, TCP, UDP). In other examples, message bus 304 may be implemented using hardware, software, circuitry, or a combination thereof to provide logic that is configured to manipulate property class data communication protocols to encapsulate messages transmitted from synthetic environment system 302 for transmission to web application server 306 that formats (i.e., encapsulates data with header, footer, payload, or other data that may be read for interpretation and handling purposes in routing data as packets, segments, frames, or the like from a source to a destination) data for transmission to destinations such as web client 314. As MMOGs may have numerous multiple users (e.g., one or more of web client 314), the use of protocols for web-based delivery (i.e., rendering and presentation of information within a web browser) may not employ features or services that are found in non-web protocols. This may include using data communication protocols that do not perform error checks, checksum calculations, or the like, such as UDP. In so doing, continuous real-time or substantially real-time interaction may be maintained with web client 314. As bandwidth capacities of data networks increase and improve, load balancing also becomes less problematic with the current infrastructure as message bus 304 and web application server 306 may be configured to handle data exchanged with large numbers of web clients. In other examples, topology 300 and the above-described elements may be varied in function, structure, implementation, or other aspects and are not limited to the descriptions provided.

Figure 3B:
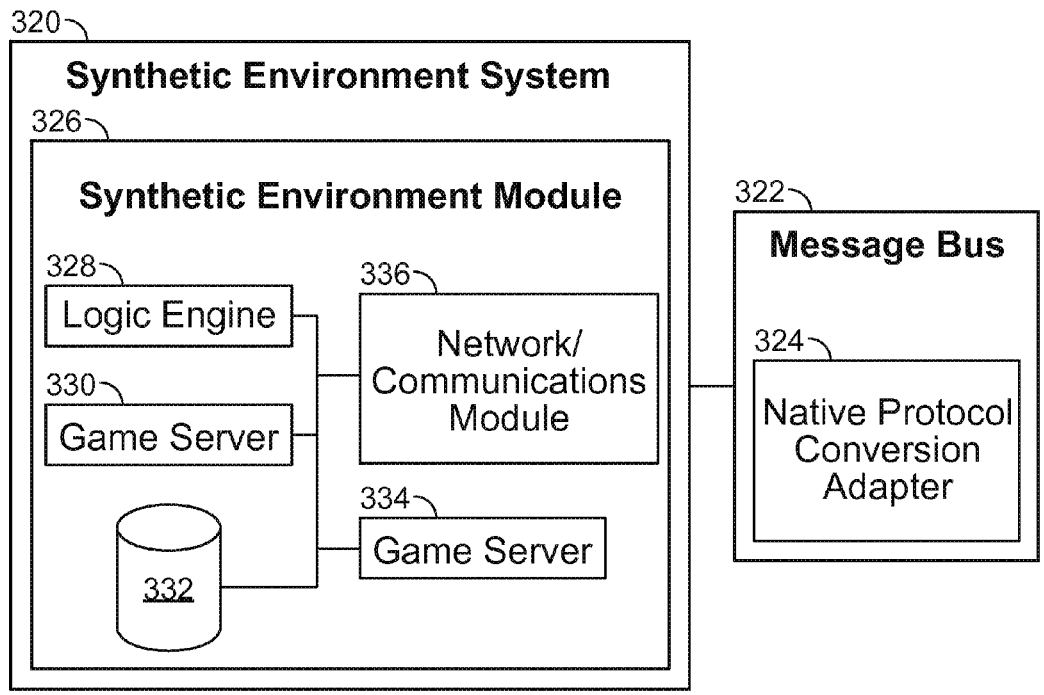
FIG. 3B illustrates an exemplary synthetic environment system architecture for web client data conversion for synthetic environment interaction.

FIG. 3B illustrates an exemplary synthetic environment system architecture for web client data conversion for synthetic environment interaction. Here, synthetic environment system 320 is shown with message bus 322 (including native protocol conversion adapter 324), the former of which includes synthetic environment module 326, logic engine 328, game server 330, game database 332, game server 334, and network communications module 336. In some examples, logic engine 328 provides control data and signals to synthetic environment module 326, game server 330, game database 332, game server 334, network communications module 336, or other modules that may be included to provide different functionality (not shown). As an example, logic engine 328 may generate control signals to game server 330 to provide instructions for instantiating a character within a synthetic environment.

Here, message bus 322 is configured to route data to and from synthetic environment system 320, which uses network communications module 336 to communicate with other elements. In some examples, data transmitted to synthetic environment system 320 may be converted (i.e., translated, transformed, adapted, encapsulated, or otherwise modified) by native protocol conversion adapter 324 using property class objects for data transmission using TCP, UDP, or the like. Conversely, data sent from synthetic environment system 320 (e.g., game data) to a web client (not shown) may be converted by message bus 322 and native protocol conversion adapter 324 for transmission to a web application server in accordance with one or more data communication protocols such as HTTP, persistent HTTP, and others. In other examples, synthetic environment system 320 and message bus 322 may be implemented differently and are not limited to the examples shown and described.

Figure 3C:
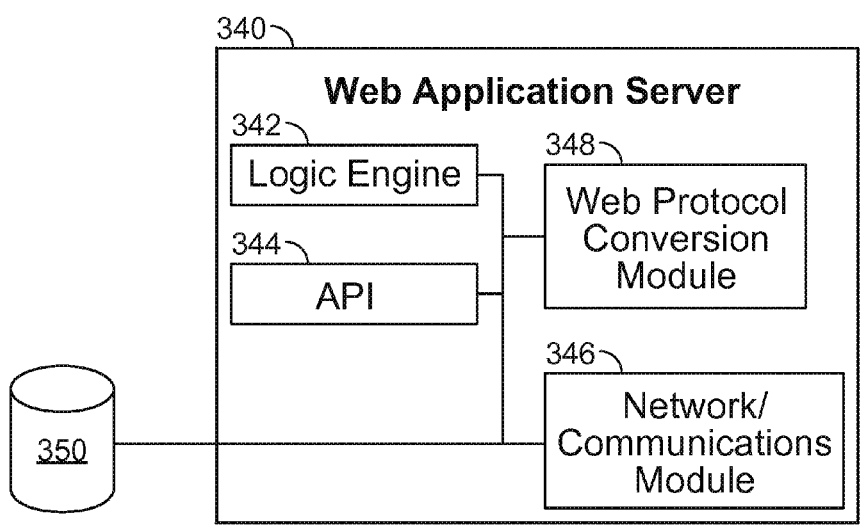
FIG. 3C illustrates an exemplary web application server architecture for web client data conversion for synthetic environment interaction.

FIG. 3C illustrates an exemplary web application server architecture for web client data conversion for synthetic environment interaction. Here, web application server 340 includes logic engine 342, one or more of application programming interface 344, network communications module 346, web protocol conversion module 348, and cache 350. In some examples, logic engine 342 may be configured to provide control data and signals for web application server 340. API 344 may be a transactional application programming interface that is configured to route data associated with a transaction request from an application (e.g., a game client implemented as a web client, synthetic environment) to another application. In other words, web application server 340 uses API 344 for data communication capabilities with other applications, operating systems, ports, or the like.

As shown, web application server 340 is configured to translate or transform data to/from web protocols to other data communication protocols using web protocol conversion module 348. Further, network communications module 346 provides input/output facilities that enable web application server 340 to transmit or receive data across various types of data communication networks. Regarding cache 350, data may be stored temporarily if a data communication link between web application server 340 and, for example, a synthetic environment (e.g., synthetic environment 208 (FIG. 2)) is unavailable. When data communication links are unavailable, a web client may interact with cached game data in cache 350 without interruption in synthetic environment interaction (e.g., game play). In other examples, web application server 340 and the above-described elements may be varied in function, structure, implementation, or other aspects, without limitation to the examples shown and described.

Figure 4A:
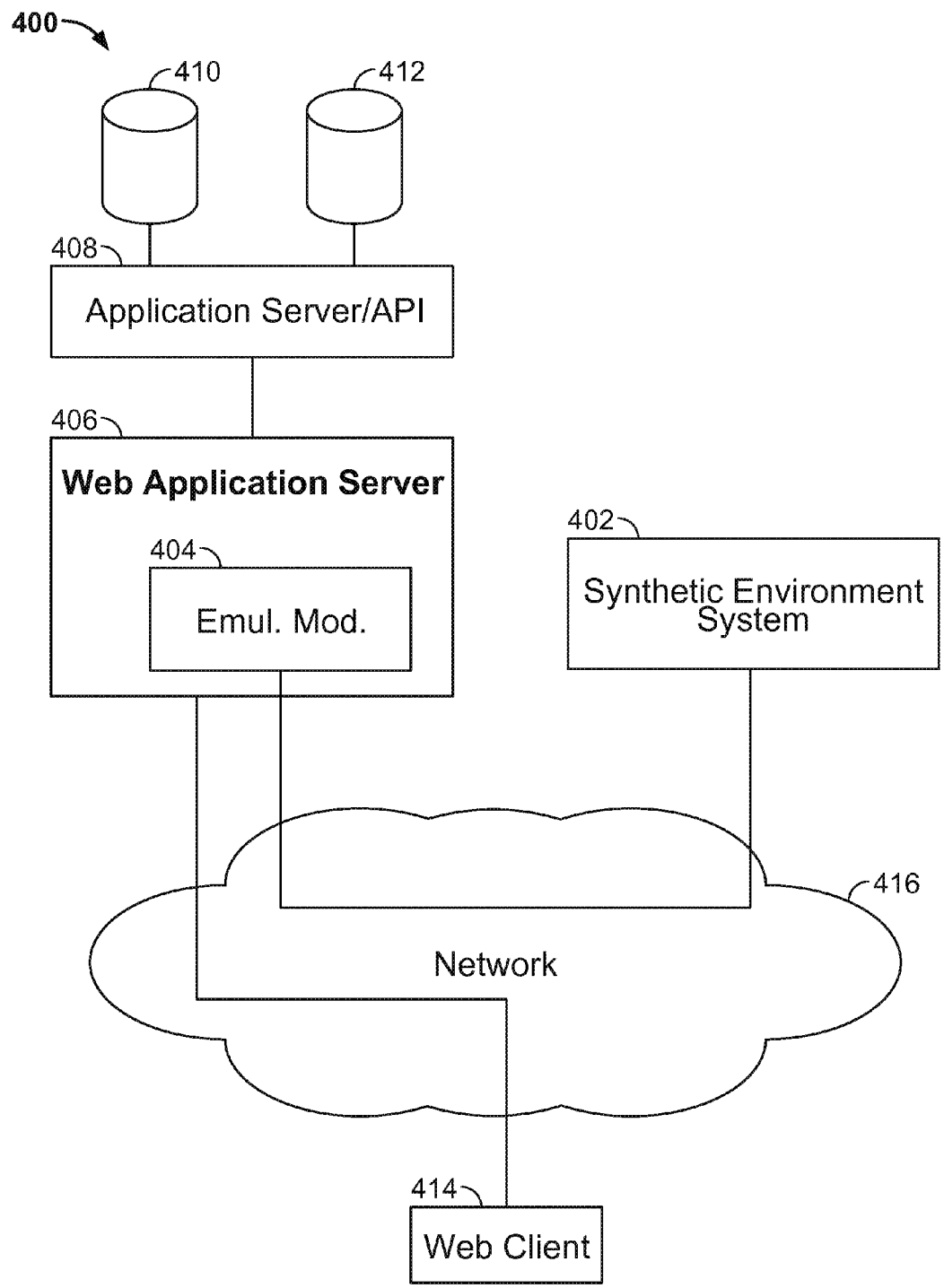
FIG. 4A illustrates an alternative exemplary web client data conversion for synthetic environment interaction system topology.

FIG. 4A illustrates an alternative exemplary web client data conversion for synthetic environment interaction system topology. Here, topology 400 includes synthetic environment system 402, emulation module 404, web application server 406, application server/APIs 408, data bases 410-412, web client 414, and network 416. In some examples, synthetic environment system 402, application server/APIs 408, data bases 410-412, web client 414, and network 416 may be implemented similarly to substantially similar to similarly-named elements (e.g., synthetic environment system 302, application server/APIs 308, databases 310-312, web client 314, and network 316) with regard to function and structure. Alternatively, web application server 406 may be implemented with game client emulation module 404. Using game client emulation module 404, web application server 406 may emulate a game client and establish a persistent connection (i.e., an asynchronous data communication link using TCP, UDP, persistent HTTP, or similar protocols) with synthetic environment system 402. Subsequently, web application server 406 can provide asynchronous interactivity between web client 414 and synthetic environment system 402 using game client emulation module 404 to emulate game protocols (e.g., property class) between web application server 406 and synthetic environment system 402. Further, web application server 406 may also be implemented to provide native protocol conversion of web protocols to/from other data communication protocols for messages exchanged between web client 414 and synthetic environment system 402. Still further, topology 400 and the above-described elements may be varied in function, structure, implementation, or other aspects without limitation to the examples shown and described.

Figure 4B:
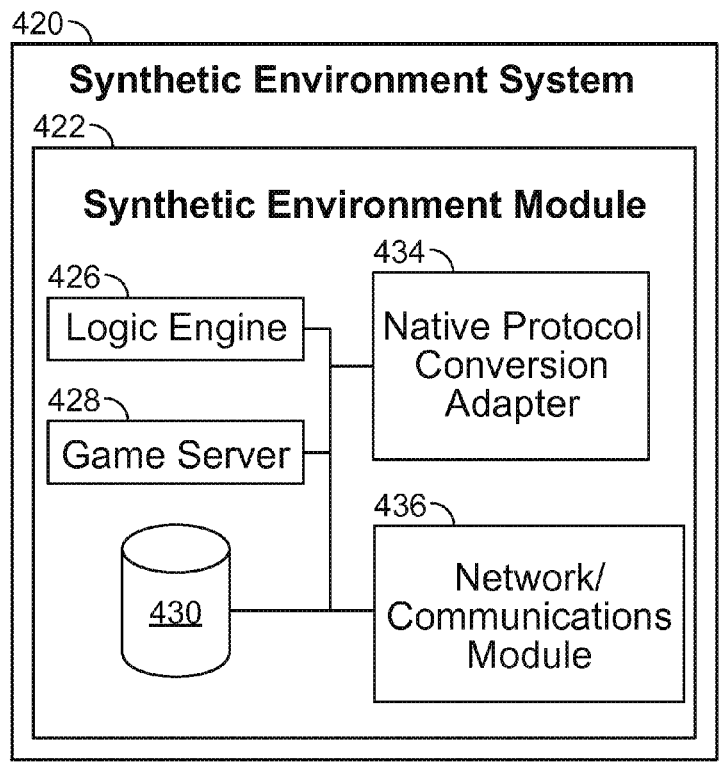
FIG. 4B illustrates an alternative exemplary synthetic environment system architecture for web client data conversion for synthetic environment interaction.

FIG. 4B illustrates an alternative exemplary synthetic environment system architecture for web client data conversion for synthetic environment interaction. Here, synthetic environment system 420 includes synthetic environment module 422, logic engine 426, game server 428, game database 430, native protocol conversion module 434, and network communications module 436. Synthetic environment module 422, in some examples, may be configured to provide features and functions of a message bus (e.g., message bus 304 (FIG. 3)), including translating or transforming data (i.e., messages) to/from web protocols to/from other data communication protocols (e.g., HTTP to TCP, UDP to HTTP, persistent HTTP to UDP, and the like) using native protocol conversion module 434. Logic engine 426, game server 428, game database 430, and network communications module 436 may be configured similarly or substantially similar to those elements described above in connection with FIG. 3A. Game server 428 may be implemented to provide processing resources for instantiating a synthetic environment and any aspects thereof (e.g., characters, interaction, attributes, graphical rendering of environmental features (e.g., terrain, weather, urban surroundings, and the like)). Further, game server 428 may also be implemented to provide other functions for implementing a synthetic environment, including physics, graphics, transaction, and other types of processing. Additional details of game servers (e.g., game server 330 (FIG. 3B), game server 428, and others) may be found in U.S. patent application Ser. No. 11/715,009, which is herein incorporated by reference. Game database 430 may be used to store data associated with a synthetic environment, without limitation. In other examples, synthetic environment system 340 and the above-described elements may be implemented differently and are not limited to the examples provided.

Figure 4C:
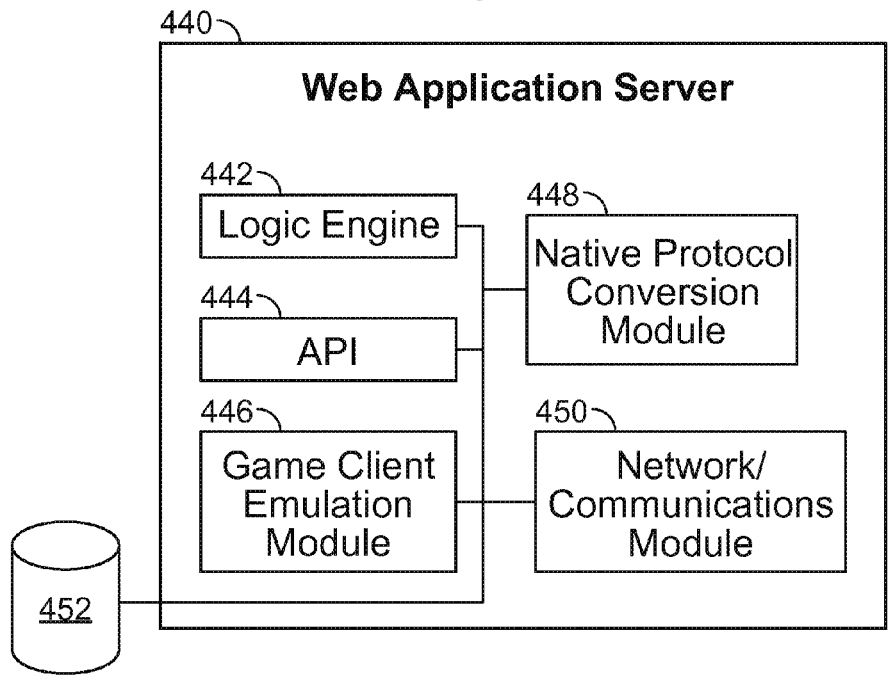
FIG. 4C illustrates an alternative exemplary web application server architecture for web client data conversion for synthetic environment interaction.

FIG. 4C illustrates an alternative exemplary web application server architecture for web client data conversion for synthetic environment interaction. Here, web application server 440 includes web application server 440, logic engine 442, API 444, game client emulation module 446, native protocol conversion module 448, network communications module 450, and cache 452. In some examples, logic engine 442 may generate control signals and data for one or more of API 444, game client emulation module 446, native protocol conversion module 448, network communications module 450, and cache 452. For example, API 444 may be used for data communication with a web client (e.g., web client 414 (FIG. 4A)), application, operating system, synthetic environment 208 (FIG. 2), or the like. When directed by logic engine 442, API 444 may transmit data (e.g., a translated or transformed message translated or transformed to another message format using a web-based or web protocol) from web application server 440 to web client 414.

Regarding game client emulation module 446, web application server 440 may be configured to emulate a game client as part of a synthetic environment. When emulating a game client, web application server 440 may be configured to communicate directly with synthetic environment system 420 (FIG. 4B) without the need or use of a message bus, instead relying upon native protocol conversion module 448 and game client emulation module 446 to translate or transform messages as necessary. In some examples, game client emulation module 446 and native protocol conversion module 448 may be implemented to understand and use property class objects in order to interpret (i.e., translate, transform, or the like) data sent to or received from synthetic environment module 422 (FIG. 4B)). By being in direct data communication (although there may be intermediate data networking components, services, and structures) with synthetic environment system 420, web application server 440 is configured to handle conversion of data for various protocols between web clients and synthetic environments. Further, web application server 440, as described herein and with regard to all other web application servers described, provide support, features, and functionality to enable data to be requested, retrieved, presented, displayed, rendered, or otherwise operated upon within a web browser. In other examples, web application server 440 and the above-described elements may be varied and are not limited to the examples shown and described.

Figure 5:
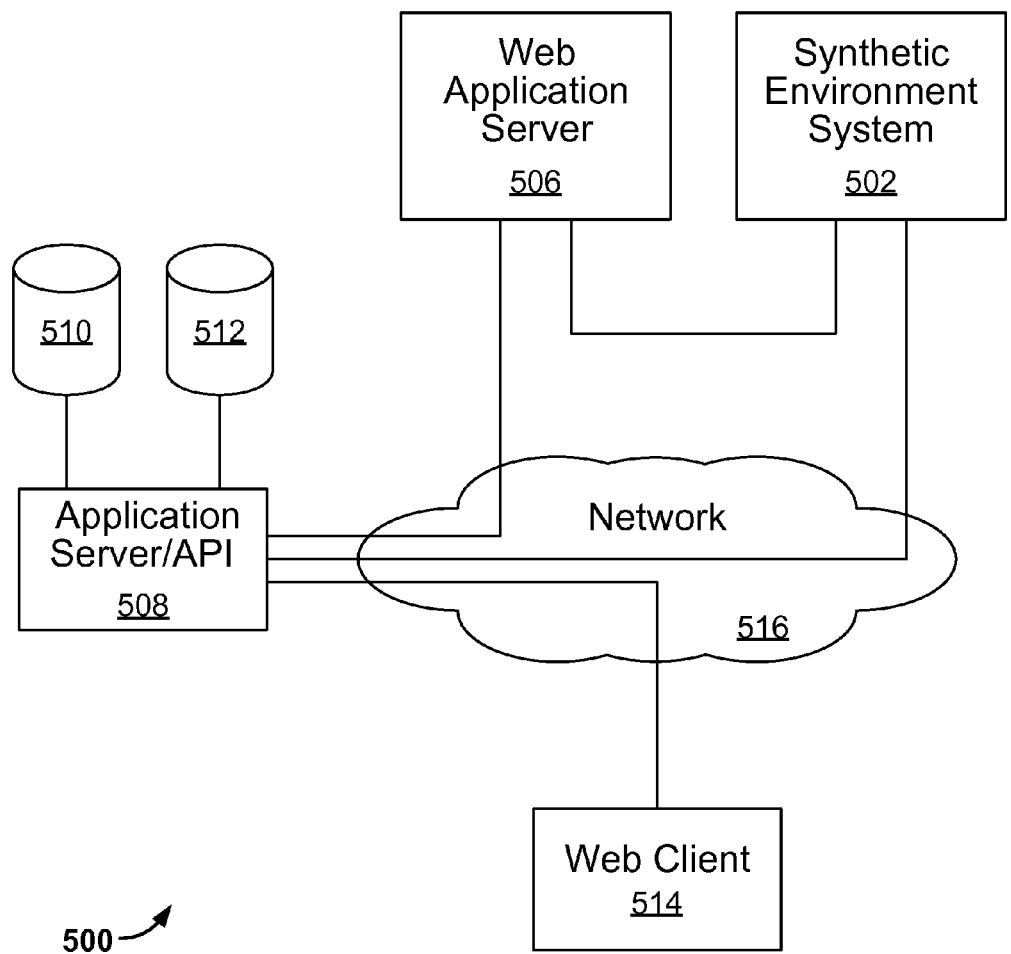
FIG. 5 illustrates another alternative exemplary web client data conversion for synthetic environment interaction system topology.

FIG. 5 illustrates another alternative exemplary web client data conversion for synthetic environment interaction system topology. Here, topology 500 includes synthetic environment system 502, web application server 506, application server/API 508, game databases 510-512, web client 514, and network 516. In some examples, the number, type, configuration, or other aspects or attributes of the above-listed elements may be varied without limitation. As an example, the number of web clients 514 may be varied and are not limited to any specific physical or hardware operating environment. Web client 514 is shown for purposes of illustration only and is not intended to be limiting of the techniques described.

Here, synthetic environment system 502 generates a synthetic environment using native game protocols such as property class. Web application server 506 provides features and functions to translate and transform data from synthetic environment system 502 for presentation in a web environment (e.g., web browser) on web client 514. In some examples, application server/API 508 may be implemented to provide protocol conversion (i.e., translation, transformation of data from a first protocol to a second protocol; as used herein protocol and protocol format may be used interchangeably) of messages transmitted between synthetic environment system 502 and web client 514. In other words, as game events (i.e., events that occur within a synthetic environment) and web events (i.e., events that occur on or are directed by web client 514) occur, messages are generated by synthetic environment system 502 and web client 514, respectively, that are translated or transformed by application server/API 508. As described herein, application server/API 508 may be any type of application server or database management system that is used to manage, read, write, store, or perform other operations to data stored in databases 510-512, which may be implemented using any type of data storage facility or repository. As shown game databases 510-512, which may be similar or substantially similar to game database 226 (FIG. 2) and configured to translate or transform data (i.e., messages) between synthetic environment system 502 and web client 514. Data stored in game databases 510-512 may be persisted (i.e., stored, written, etc.) by using data stored in game databases from within a synthetic environment (e.g., game database 226). Various types of rules (e.g., when a data network connection is present, immediately after restoring a data network connection, periodic (e.g., every hour, day, or the like), and others) may be used to determine when data should be persistent from game database 226 to game databases 510-512. Further, the number of game databases 510-512 may be varied and is not intended to be a limiting feature of the techniques described. In other examples, topology 500 may be varied in function, structure, implementation, or other aspects without limitation to the examples shown and described.

Figure 6:
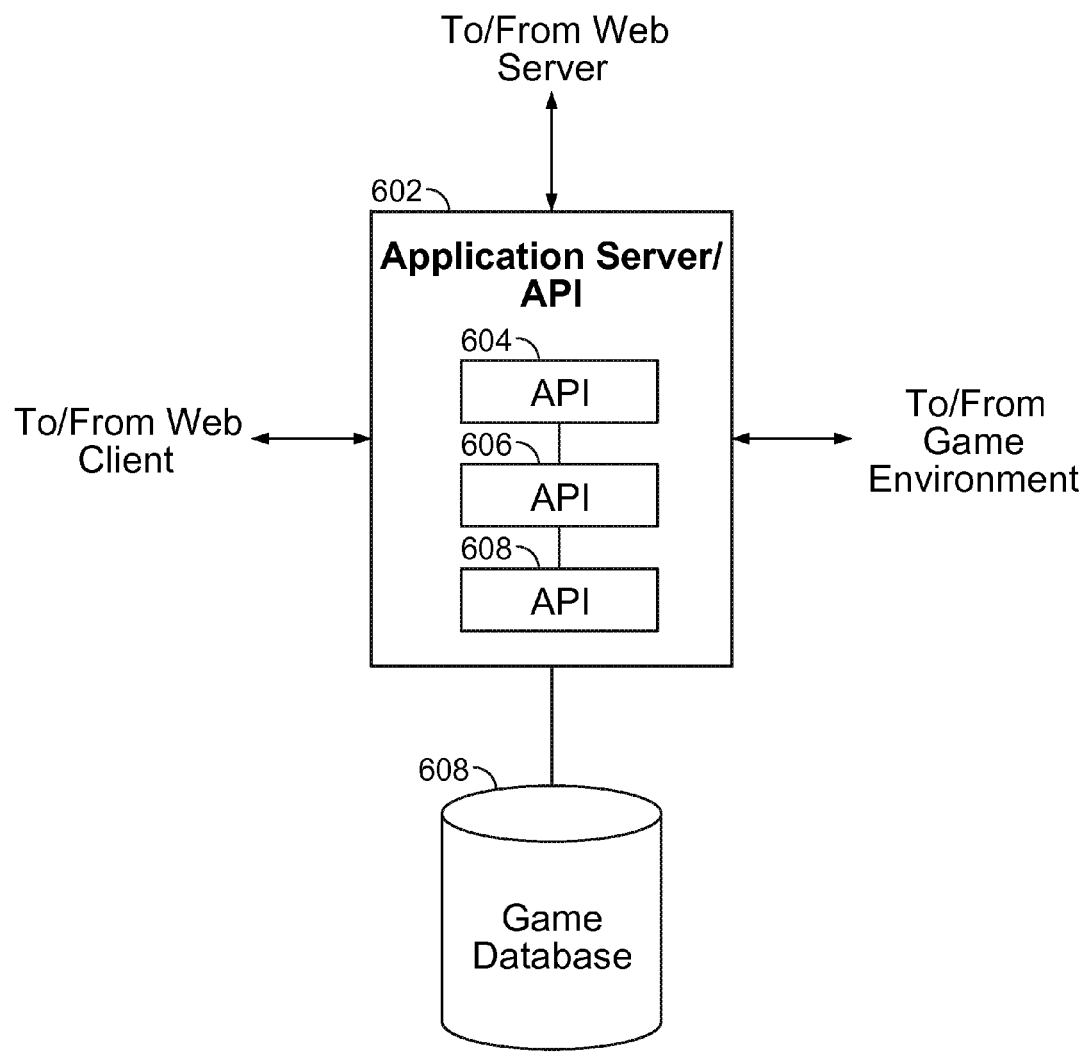
FIG. 6 illustrates an exemplary database and application server architecture for web client data conversion for synthetic environment interaction.

FIG. 6 illustrates an exemplary database and application server architecture for web client data conversion for synthetic environment interaction. Here, application server/API 602 includes APIs 604-608 and is in data communication with database 608. In some examples, application server 602 may use APIs 604-608 to translate or transform data and send the translated or transformed messages to web client 514 (FIG. 5) or synthetic environment system 502 (FIG. 5). In other words, transactional APIs (i.e., API 604-608) may be used for individual applications (e.g., web browsing applications) that are used to convert messages sent from a source to a protocol associated with a destination. For example, a message sent by synthetic environment system 502 indicating a game event has occurred may be sent to application server/API 602, which selects API 606 for conversion of the message to HTTP for transmission to web client 514. Game data stored in database 608 may be updated with data received from a game environment (e.g., synthetic environment system 502) and used to maintain continuous real-time or substantially real-time interactivity with web client 514. Further, data may be sent to web application server 506 for encapsulation according to web protocols for delivery within a web browser. In other examples, the number, type, configuration, implementation, and above-described techniques may be varied without limitation.

Figure 7A:
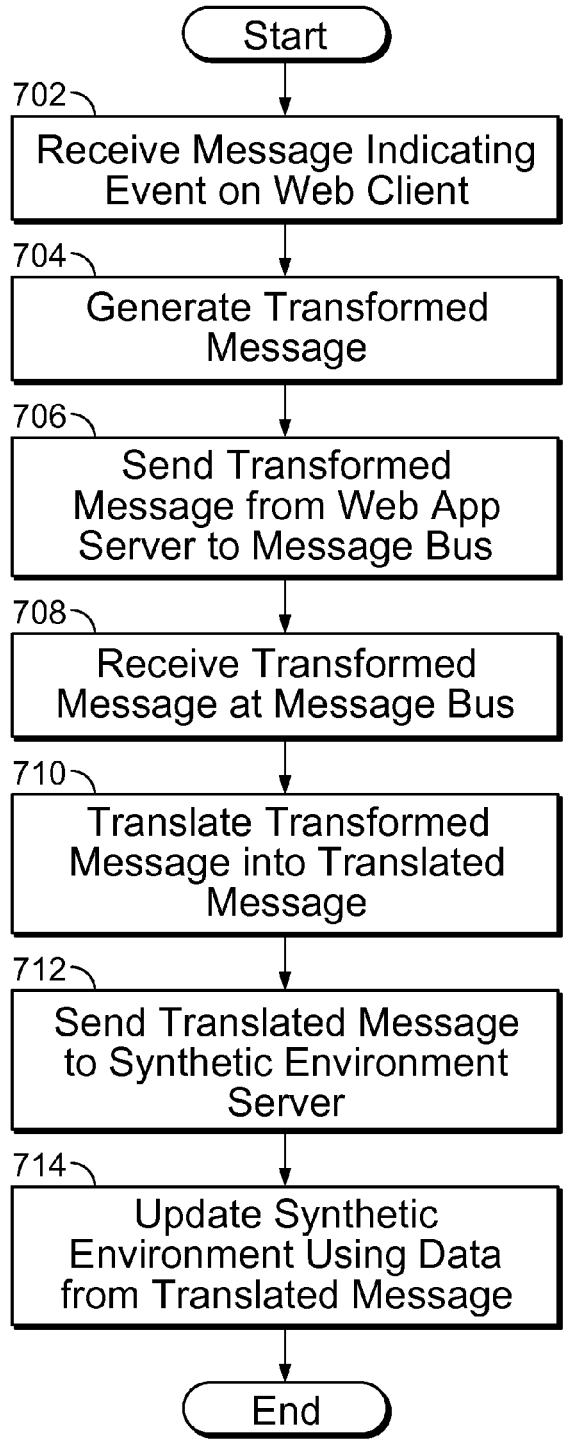
FIG. 7A illustrates an exemplary process for web client data conversion for synthetic environment interaction.

FIG. 7A illustrates an exemplary process for web client data conversion for synthetic environment interaction. Here, a message is received indicating an event has occurred or been initiated for interaction with a synthetic environment (e.g., as instantiated by synthetic environment system 302 (FIG. 3A)) on a web client (e.g., web client 314 (FIG. 3A)) (702). A transformed message is generated (704). The transformed message is sent from a web application server (e.g., web application server 306 (FIG. 3A)) to a message bus (e.g., message bus 304 (FIG. 3A)) (706). Once sent, the message (i.e., data) is received at message bus 304 (708). At message bus 304, the transformed message is translated into a translated message (710). Upon completion of translation, the translated message may be sent from message bus 304 to game (i.e., synthetic environment) server 106-110 (FIG. 1) (712). In some examples, translating a message may also refer to converting a message from a web protocol format (e.g., HTTP) to another data communication protocol (e.g., TCP, UDP) format that may be used for communicating objects specified in a property class associated with a synthetic environment. Once received, parsed, and interpreted, the translated message may be used to update a synthetic environment. The above-described process may be used to update a game environment when an event occurs on a web client (i.e., web event) that is configured to interact with a synthetic environment. In other examples, the above-described process may be varied and is not limited to the examples shown and described.

Figure 7B:
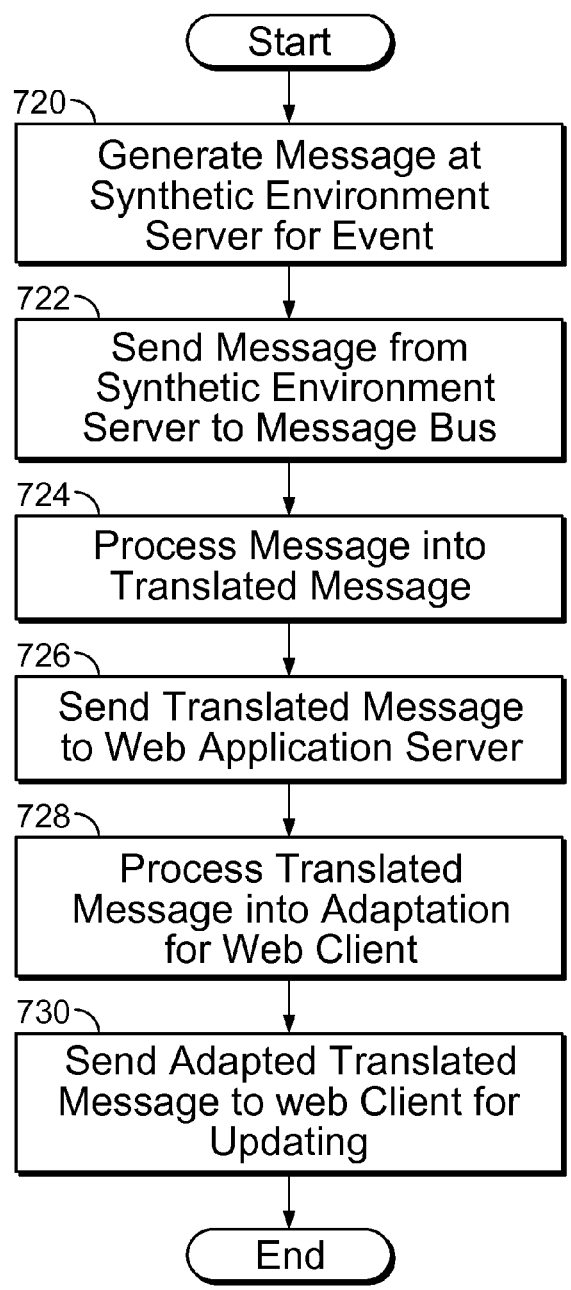
FIG. 7B illustrates another exemplary process for web client data conversion for synthetic environment interaction.

FIG. 7B illustrates another exemplary process for web client data conversion for synthetic environment interaction. Here, a process is described for updating a web client when an event occurs within a synthetic environment (i.e., game event). In some examples, when a game event occurs, a message is generated at a synthetic environment (i.e., game) server (e.g., game server 210 (FIG. 2)) (720). Once generated, the message is sent from synthetic environment server 210 to message bus 202 (FIG. 2) (722). Message bus 202 is configured to process the message into a translated message (724). Once processed (i.e., converted) into a translated message, message bus 202 sends the translated message to web application server 206 (FIG. 2) (726). The translated message is processed for adaptation (i.e., transformation) into a transformed message for reception by a web client (e.g., web clients 228-232 (FIG. 2)) (728). Once processed, the translated message is sent to one or more web clients, which are updated based on the game event (730). In other examples, the above-described process may be varied and is not limited to the examples shown and described.

Figure 8A:
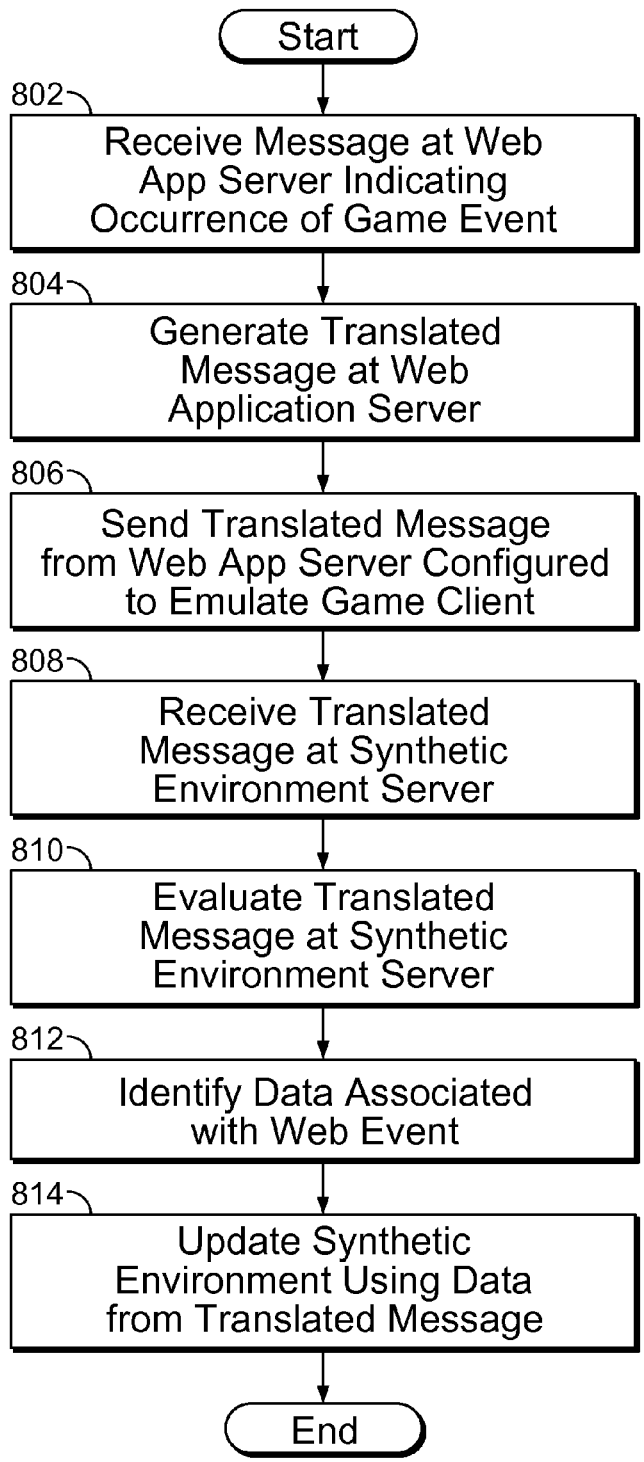
FIG. 8A illustrates an alternative exemplary process for web client data conversion for synthetic environment interaction.

FIG. 8A illustrates an alternative exemplary process for web client data conversion for synthetic environment interaction. Here, a message is received by web application server 406 (FIG. 4A) indicating a web event has occurred (802). Subsequently, web application server 406 generates a translated message (804). Once generated, the translated message is sent from web application server 406, emulating game client 218-224 (FIG. 2) to synthetic environment system 402 (FIG. 4A) (806). The translated message is received by a synthetic environment server (e.g., game servers 210-216 (FIG. 2)) (808). The synthetic environment server (or servers) evaluates the translated message (810). Once evaluated, data associated with the web event is identified (812). The identified data, in some examples, is used to update the synthetic environment in order to reflect any environmental changes due to the occurrence of the web event (814). In some examples, web events and game events may be any type of event that occurs within a synthetic environment, occurring on a web client or within the synthetic environment, respectively. In other examples, the above-described process may be varied and is not limited to the descriptions provided.

Figure 8B:
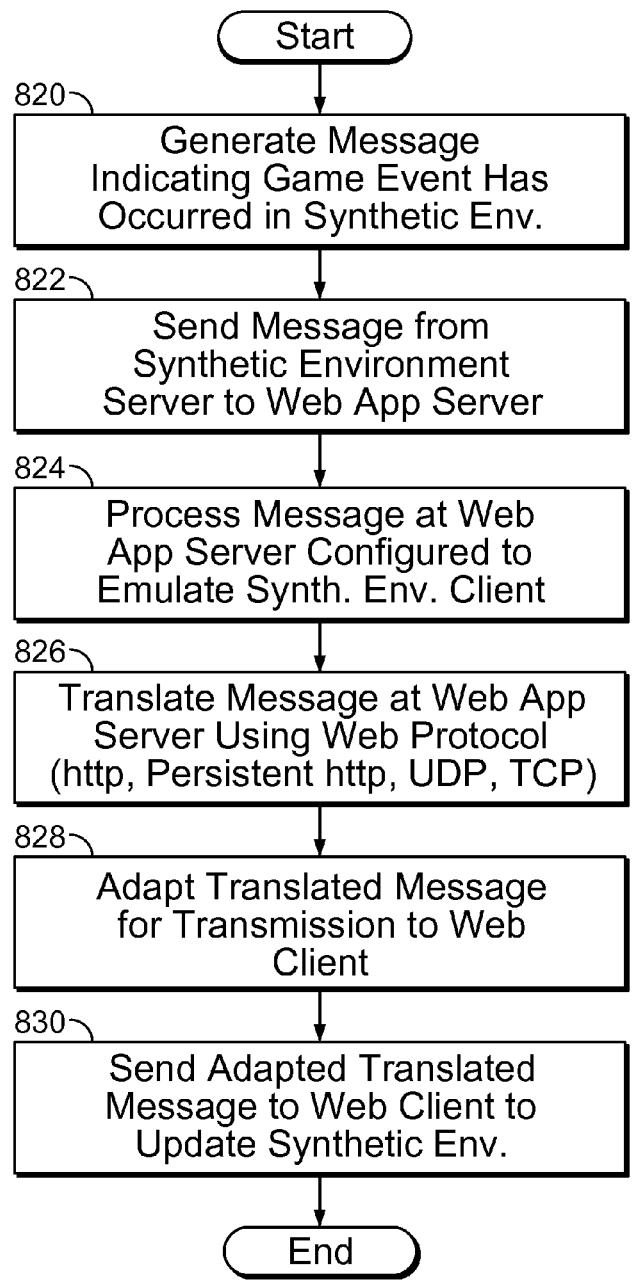
FIG. 8B illustrates another alternative exemplary process for web client data conversion for synthetic environment interaction.

FIG. 8B illustrates another alternative exemplary process for web client data conversion for synthetic environment interaction. Here, a process is described for updating web clients when a game event occurs, using the topology as described above in connection with FIG. 4A. In some examples, a message is generated indicating a game event has occurred within a synthetic environment (820). The generated message is sent from the synthetic environment (e.g., synthetic environment system 402 (FIG. 4)) to a web application server (e.g., web application server 406 (FIG. 4)) (822). The generated message is then received and processed by the web application server, which has been configured to emulate a game client (824). Thus, when the generated message is received by web application server 406, the message is translated by the web application server using a web protocol (e.g., HTTP, persistent HTTP, TCP, UDP, and others), which may be any data communication protocol that can be used to format data for transmission to a web client (e.g., web client 414 (FIG. 4A)) (826). Once translated into a format for a web client to interpret, parse, retrieve, request, render, or otherwise use via a web browser, the translated message is adapted (828). After adapting the translated message, the adapted, translated message is sent to web client 414 and used to update the synthetic environment accessible from web client 414, regardless of whether a data network connection is established (if not, cached data may be used to continue to provide an interactive synthetic environment for web client 414) (830). In other examples, the above-described process may be varied and is not limited to the examples described.

Figure 9A:
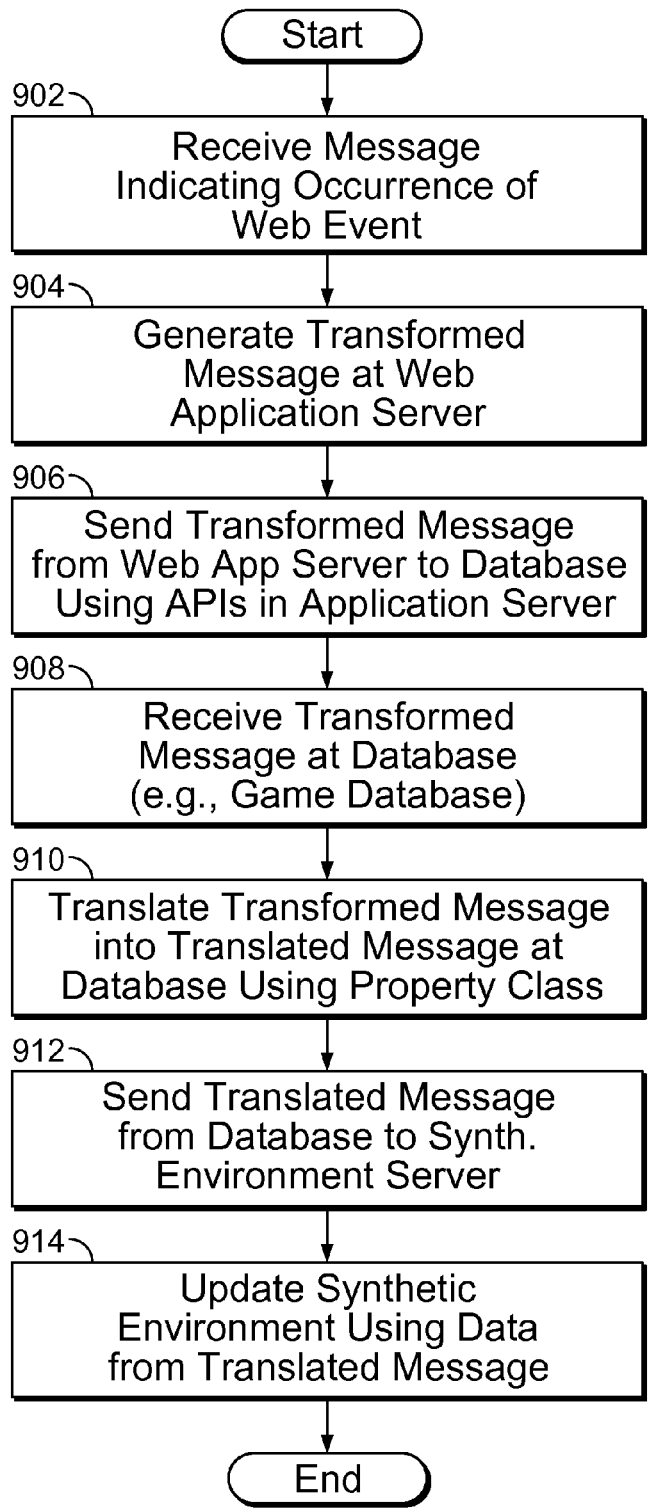
FIG. 9A illustrates yet another alternative exemplary process for web client data conversion for synthetic environment interaction.

FIG. 9A illustrates yet another alternative exemplary process for web client data conversion for synthetic environment interaction. Here, a process is described for updating a synthetic environment when a web event occurs, using the topology as described above in connection with FIG. 5. In some examples, a message indicating occurrence of a web event is received by web application server 506 (FIG. 5) (902). Web application server 506 generates a transformed message (904). The transformed message, in some examples, is sent from web application server 506 to a database (e.g., database 510-512) being managed by application server 602 (FIG. 6) and having one or more APIs (e.g., APIs 604-608 (FIG. 6)) (906). Subsequently, the transformed message is received by application server 602 (908). Once received, the transformed message is translated into a translated message at databases 510-512 and application server 602 using a property class object or set of objects, as described herein (910). Once translated for use by synthetic environment system 502 (FIG. 5), the translated message is sent from databases 510-512/application server 602 to synthetic environment system 502 (912). Upon receipt of the translated message, synthetic environment system 502 updates the synthetic environment using data included in the translated message (914). In other examples, the above-described process may be varied and is not limited to the examples shown and described.

Figure 9B:
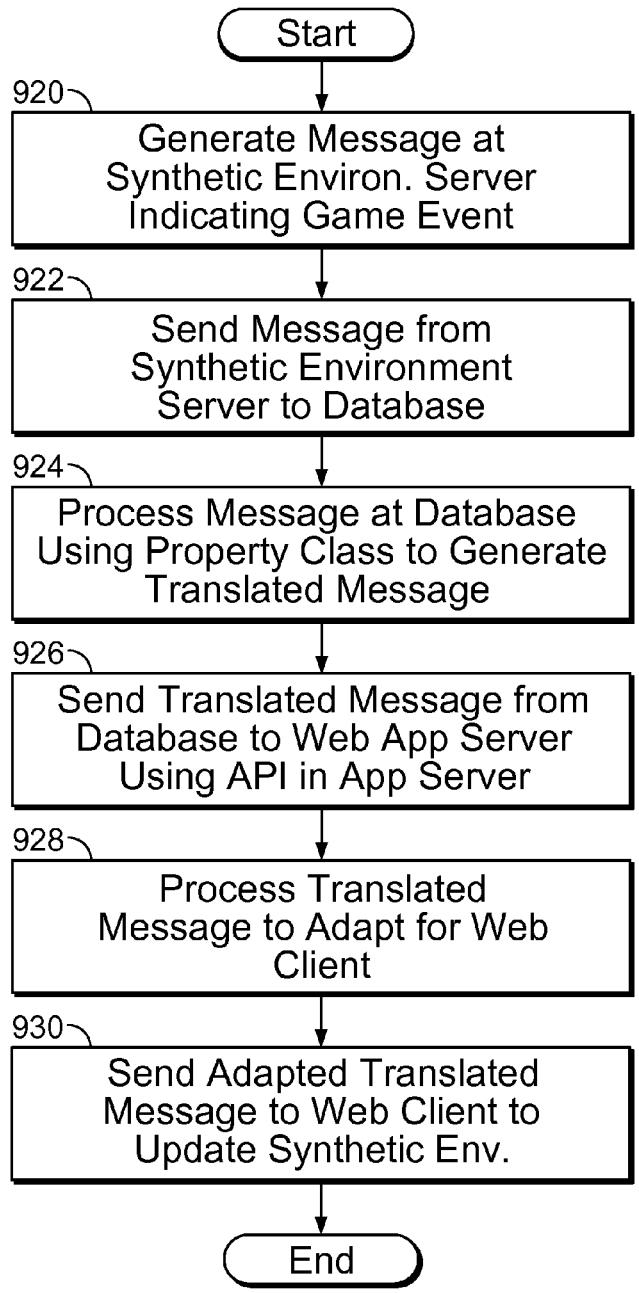
FIG. 9B illustrates a further alternative exemplary process for web client data conversion for synthetic environment interaction.

FIG. 9B illustrates a further alternative exemplary process for web client data conversion for synthetic environment interaction. Here, a process for updating a web client for a game event occurring in a synthetic environment using a topology similar or substantially similar to that described above in connection with FIGS. 5 and 6 is shown. In some examples, a message indicating occurrence of a game event (i.e., an event occurring within a synthetic environment) is generated at synthetic environment system 502 (FIG. 5) (920). Once generated, the message is sent from synthetic environment system 502 to databases 510-512 (FIG. 5) (922). Here, application server 508 (FIG. 5) may be implemented and configured to receive the message. Once received, the message is processed referring to object specifications within a property class in order to translate the message. As a result of processing, a translated message is produced that correlates the game event to an update that, once written to web client 514 (FIG. 5), will update a version of the synthetic environment accessible from web client 514 (924). Once translated by application server 508, the translated message is sent from databases 510-512/application server 508 to web application server 506 using one or more APIs (e.g., APIs 604-608 (FIG. 6)) (926). Upon receipt, the translated message is adapted by web application server 506 for reception and further processing by web client 514 (928). Subsequently, the adapted translated message is transmitted from web application server 506 to web client 514, whereupon data included in the adapted, translated message is used to update a version of the synthetic environment accessible from web client 514 (930). In other examples, the above-described processes may be varied and are not limited to those shown and described.

Figure 10:
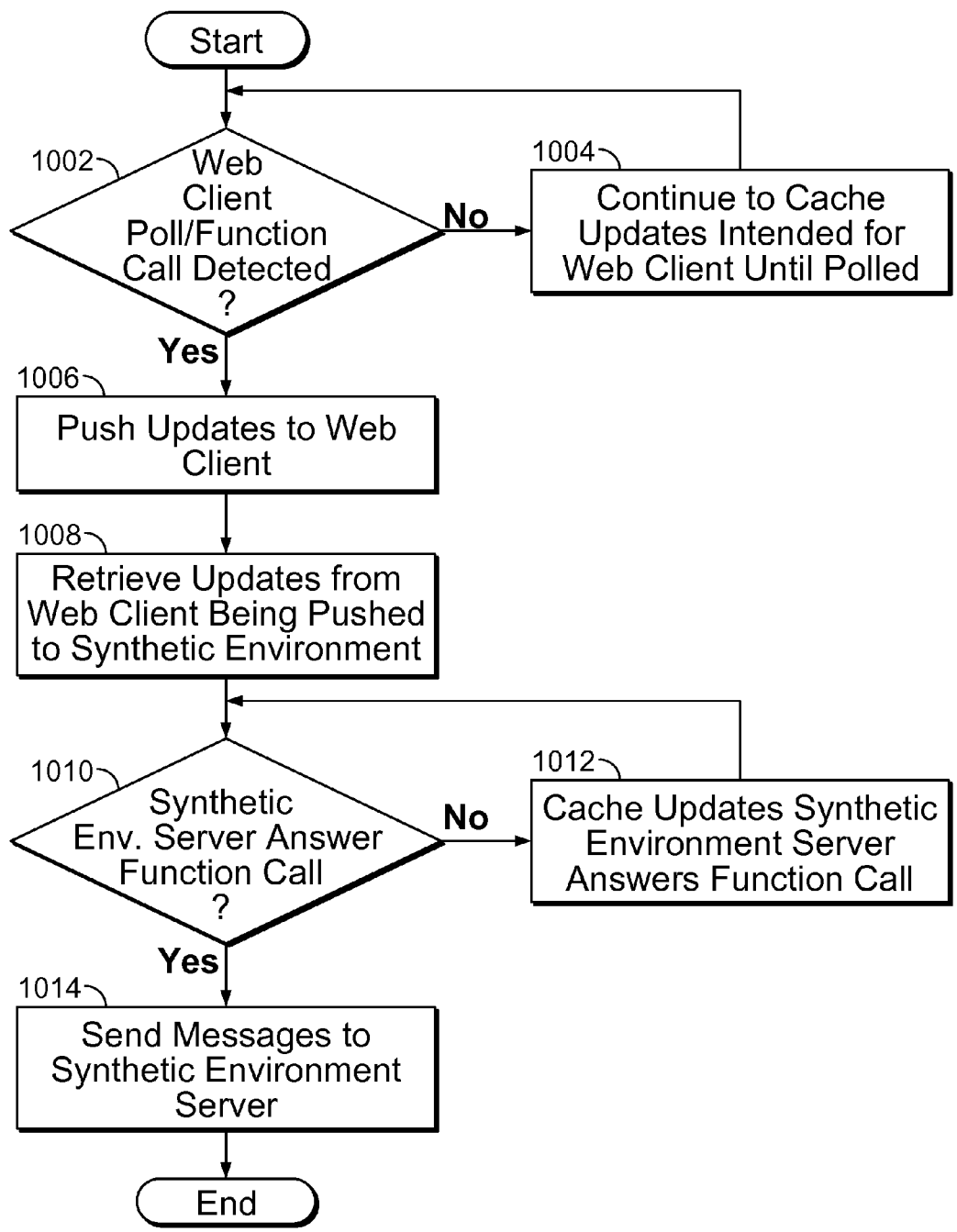
FIG. 10 illustrates an exemplary sub-process for web client data conversion for synthetic environment interaction.

FIG. 10 illustrates an exemplary sub-process for web client data conversion for synthetic environment interaction. Here, a determination is made as to whether a function call from a web client (i.e., polling) has been detected (1002). If no function call is detected, then the process loops and synthetic environment updates from, for example, synthetic environment system 302 (FIG. 3) are cached (1004). If a function call is detected, then cached or stored updates are "pushed" (i.e., transmitted without an initiating request) to a web client (1006). In some examples, updates may be pushed by a web application server (e.g., web application server 306 (FIG. 3A)), web application server emulating a game client (e.g., web application server 406 and game client emulation module 404 (FIG. 4)), or application server/API (e.g., application server/API 508 (FIG. 5)). In other examples, different implementations may be used to transmit synthetic environment updates to a web client.

After retrieving updates to a web client from a synthetic environment, updates associated with web events are processed for updating synthetic environment system 502 (FIG. 5). In other examples, the order in which updates are checked for web clients or synthetic environment(s) may be varied and are not limited to the order presented in the present examples. Here, updates associated with web events are retrieved from web clients for pushing to synthetic environment system 502 (1008). Once retrieved, a determination is made as to, whether a synthetic environment server (e.g., game servers 210-216 (FIG. 2) respond to a call request (i.e., function call) (1010). If no answer is received from a synthetic environment server, then updates intended for synthetic environment system 502 are cached until a response is received (1012). If a response is received, then messages associated with the updates intended for updating the synthetic environment are sent (1014). In other examples, the above-described processes in FIGS. 7A-9B may be varied in order, steps, operation, or other aspects are not limited to the examples shown and described.

Figure 11A:
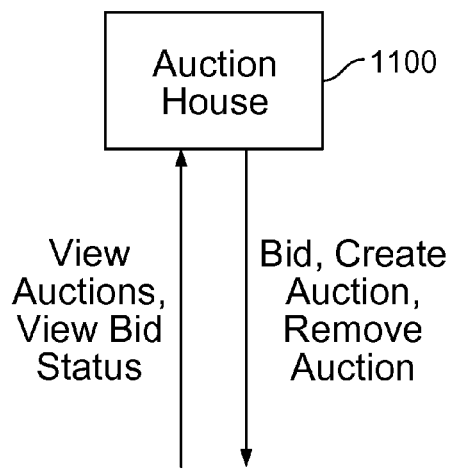
FIGS. 11A-11G illustrate exemplary features and functions using web client data conversion for synthetic environment interaction.
Figure 11B:
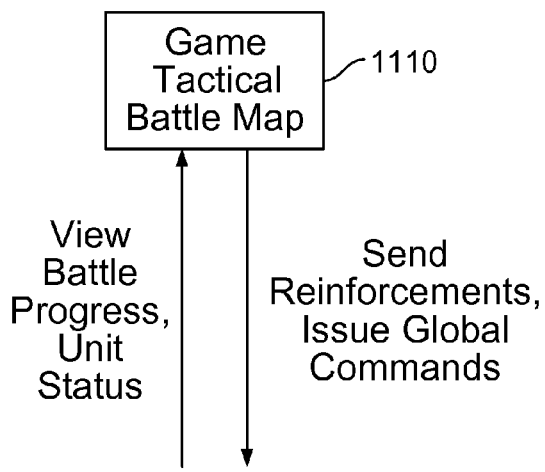
Figure 11C:
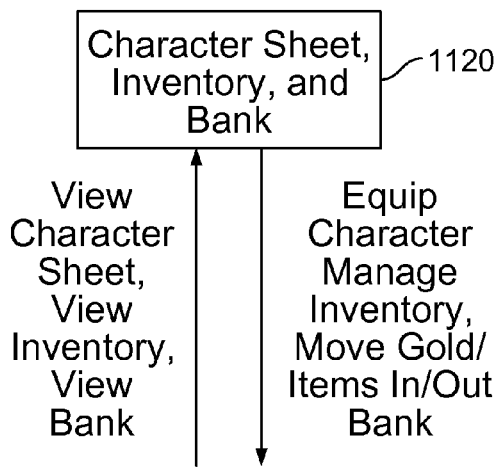
Figure 11D:
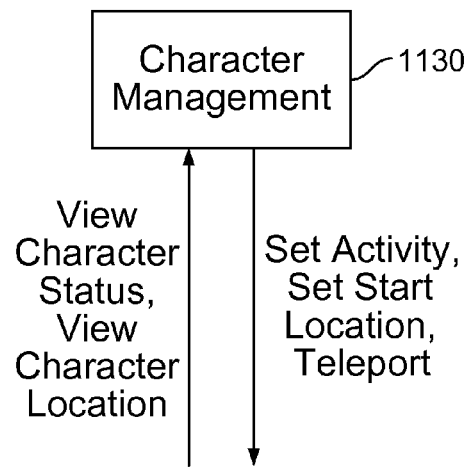
Figure 11E:
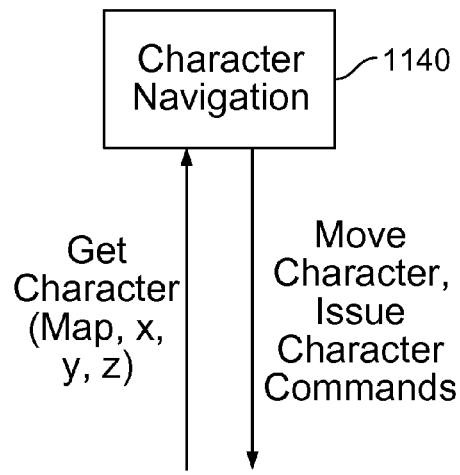
Figure 11F:
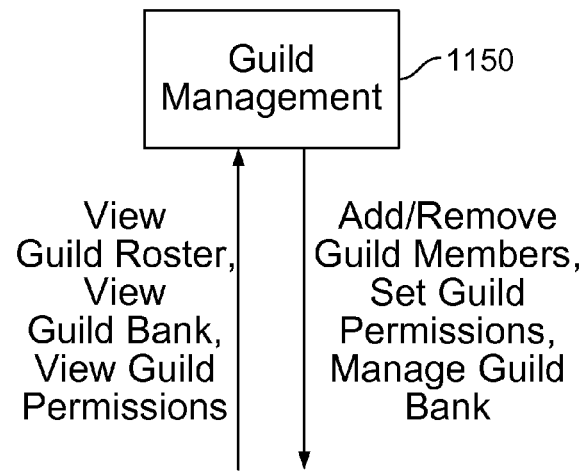
Figure 11G:
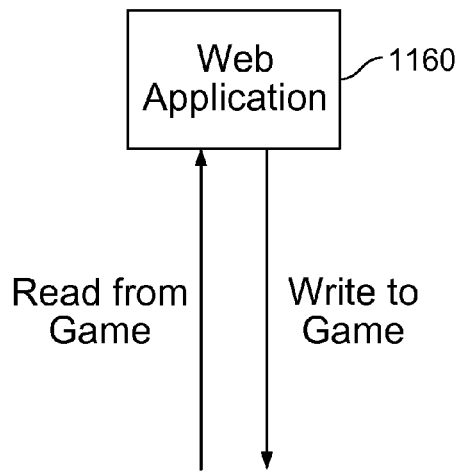

FIGS. 11A-11F illustrate exemplary features and functions using web client data conversion for synthetic environment interaction. Types of activities, actions, functions, features, or web events ("web events") that may be performed using the techniques described herein include participating in an auction (e.g., function 1100 (FIG. 11A)), retrieving, displaying, and presenting a tactical battle map (e.g., function 1110 (FIG. 11B)), reviewing or modifying a game character sheet, inventory or bank (i.e., monetary account associated with a game character) (e.g., function 1120 (FIG. 11C)), managing information or data associated with a game character (e.g., function 1130 (FIG. 11D)), character navigation (i.e., moving a character about a synthetic environment) (e.g., function 1140 (FIG. 11E)), guild (i.e., an organization that a given user's character may belong to (e.g., warrior's guild, magician's guild, sorcerer's guild, engineers' guild, game developer's guild, patent attorney's guild, or any other type of collective group that may assemble its membership based on a common attribute, characteristic, experience, trade, background, or the like for personal, professional, social, gaming, or other purposes than those stated here)) management, or other features or functions, without limitation to the examples shown and described. As a general example, any type of web application that may be used to implement a feature or function that yields data to be read from or written to a synthetic environment may be implemented for web-based interaction using the described techniques (e.g., FIG. 11G).

Figure 12:
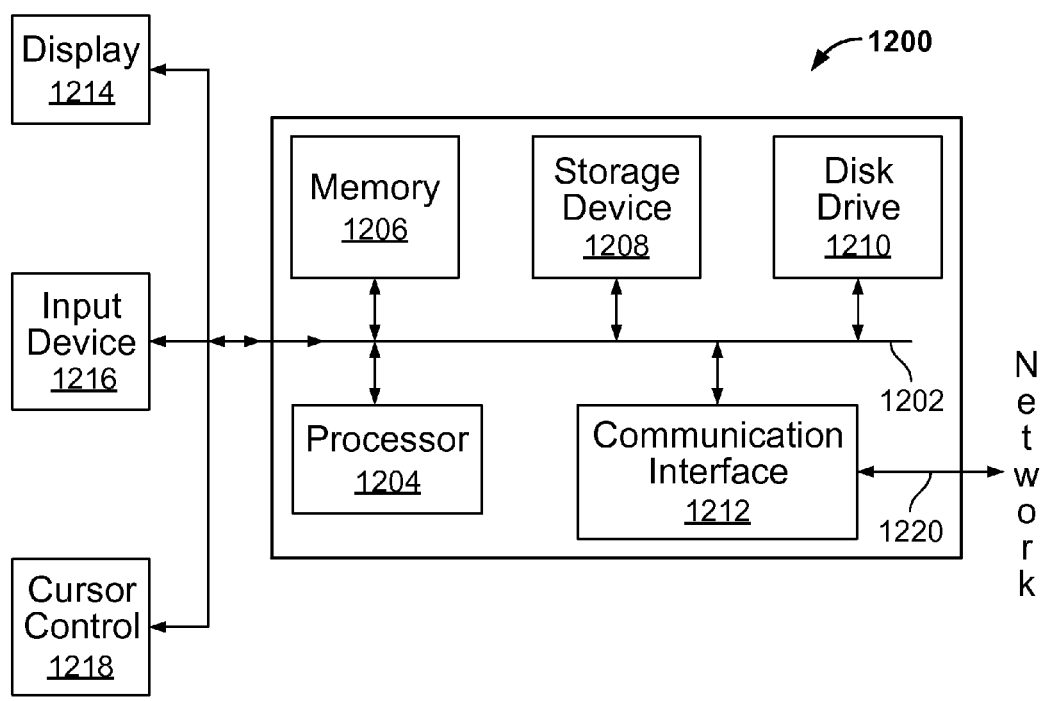
FIG. 12 illustrates an exemplary computer system suitable for web client data conversion for synthetic environment interaction.

FIG. 12 illustrates an exemplary computer system suitable for web client data conversion for synthetic environment interaction. In some examples, computer system 1200 may be used to implement computer programs, applications, methods, processes, or other software to perform the above-described techniques. Computer system 1200 includes a bus 1202 or other communication mechanism for communicating information, which interconnects subsystems and devices, such as processor 1204, system memory 1206 (e.g., RAM), storage device 1208 (e.g., ROM), disk drive 1210 (e.g., magnetic or optical), communication interface 1212 (e.g., modem or Ethernet card), display 1214 (e.g., CRT or LCD), input device 1216 (e.g., keyboard), and cursor control 1218 (e.g., mouse or trackball).

According to some examples, computer system 1200 performs specific operations by processor 1204 executing one or more sequences of one or more instructions stored in system memory 1206. Such instructions may be read into system memory 1206 from another computer readable medium, such as static storage device 1208 or disk drive 1210. In some examples, hard-wired circuitry may be used in place of or in combination with software instructions for implementation.

The term "computer readable medium" refers to any tangible medium that participates in providing instructions to processor 1204 for execution. Such a medium may take many forms, including but not limited to, non-volatile media and volatile media. Non-volatile media includes, for example, optical or magnetic disks, such as disk drive 1210. Volatile media includes dynamic memory, such as system memory 1206.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1202 for transmitting a computer data signal.

In some examples, execution of the sequences of instructions may be performed by a single computer system 1200. According to some examples, two or more computer systems 1200 coupled by communication link 1220 (e.g., LAN, PSTN, or wireless network) may perform the sequence of instructions in coordination with one another. Computer system 1200 may transmit and receive messages, data, and instructions, including program, i.e., application code, through communication link 1220 and communication interface 1212. Received program code may be executed by processor 1204 as it is received, and/or stored in disk drive 1210, or other non-volatile storage for later execution.

Although the foregoing examples have been described in some detail for purposes of clarity of understanding, the invention is not limited to the details provided. There are many alternative ways of implementing the invention. The disclosed examples are illustrative and not restrictive.

What is claimed:

1. A method, comprising:
receiving a message indicating occurrence of an event on a web client, the message being received from the web client by a web application server configured to generate a transformed message from a first protocol format to a second protocol format;
sending the transformed message from the web application server to a message bus using the second protocol format;
receiving the transformed message at the message bus;
translating the transformed message into a translated message at the message bus, the transformed message being translated from the second protocol to a third protocol using a property class;
sending the translated message from the message bus to a synthetic environment server according to the property class; and
updating the synthetic environment using data included in the translated message, wherein the synthetic environment is updated in substantially real-time.

2. The method of claim 1, wherein the event comprises a game event.

3. The method of claim 1, wherein the synthetic environment comprises a game environment.

4. The method of claim 1, wherein the web client is configured to poll the web application server, the message being sent to the web application server when a response is sent from the web application server to the web client in response to the poll.

5. The method of claim 1, wherein the data is game event data.

6. The method of claim 1, wherein the web client and the web application server are in data communication using a persistent data communication link.

7. The method of claim 6, wherein the message is transmitted over the persistent data communication link.

8. The method of claim 1, wherein the first protocol comprises a data communication protocol.

9. The method of claim 8, wherein the data communication protocol comprises a web-based protocol.

10. The method of claim 8, wherein the data communication protocol comprises hyper text transfer protocol.

11. The method of claim 8, wherein the data communication protocol comprises persistent hyper text transfer protocol.

12. The method of claim 8, wherein the data communication protocol comprises transmission control protocol.

13. The method of claim 8, wherein the data communication protocol comprises user datagram protocol.

14. The method of claim 1, wherein the message bus comprises a message notification system.

15. The method of claim 1, wherein the property class indicates an object associated with the translated message, the object being instantiated to update the synthetic environment.

16. The method of claim 1, wherein the message bus is configured to translate the transformed message from a synchronous format to an asynchronous format associated with the translated message.

17. The method of claim 1, wherein the synthetic environment is updated when a write operation is performed on a database associated with the synthetic environment server.

18. The method of claim 1, wherein the synthetic environment is updated when an interactive modification in the synthetic environment occurs using the data in the translated message.

19. A method, comprising:
generating a message at a synthetic environment server indicating occurrence of an event within a synthetic environment;
sending the message from the synthetic environment server to a message bus, the message being formatted according to a property class;
processing the message at the message bus, the message being translated into a translated message using the property class, wherein the translated message is formatted according to a web protocol;
sending the translated message from the message bus to a web application server;
processing the translated message at the web application server, the web application server being configured to adapt the translated message for data transmission to a web client; and
sending the translated message, after processing by the web application server, to the web client, wherein data included in the translated message is used to update the web client in substantially real-time.

20. The method of claim 19, wherein the event comprises a game event.

21. The method of claim 19, wherein the synthetic environment comprises a game environment.

22. The method of claim 19, wherein the translated message is sent to the web client when the web application server is polled by the web client.

23. The method of claim 19, wherein the web client and the web application server are in data communication using a persistent data communication link.

24. The method of claim 19, wherein the synthetic environment is updated when a write operation is performed on a database associated with the synthetic environment server.

25. The method of claim 19, wherein the synthetic environment is updated when an interactive modification in the synthetic environment occurs using the data in the translated message.

26. A system, comprising:
a memory configured to store data associated with a synthetic environment; and
a processor configured to receive a message indicating occurrence of an event on a web client, the message being received from the web client by a web application server configured to generate a transformed message from a first protocol format to a second protocol format, to send the transformed message from the web application server to a message bus using the second protocol format, to receive the transformed message at the message bus, to translate the transformed message into a translated message at the message bus, the transformed message being translated from the second protocol to a third protocol using a property class, to send the translated message from the message bus to a synthetic environment server according to the property class, and to update the synthetic environment using data included in the translated message, wherein the synthetic environment is updated in substantially real-time.

27. A system, comprising:
a memory configured to store data associated with a synthetic environment; and
a processor configured to generate a message indicating occurrence of an event within the synthetic environment, to send the message from a synthetic environment server to a message bus, the message being formatted according to a property class, to process the message at the message bus, the message being translated into a translated message using the property class, wherein the translated message is formatted according to a web protocol, to send the translated message from the message bus to a web application server, to process the translated message at the web application server, the web application server being configured to adapt the translated message for data transmission to a web client, and to send the translated message, after processing by the web application server, to the web client, wherein data included in the translated message is used to update the web client in substantially real-time.

28. A computer program product embodied in a tangible non-transitory computer readable medium and comprising computer instructions for:
receiving a message indicating occurrence of an event on a web client, the message being received from the web client by a web application server configured to generate a transformed message from a first protocol format to a second protocol format;
sending the transformed message from the web application server to a message bus using the second protocol format;
receiving the transformed message at the message bus;
translating the transformed message into a translated message at the message bus, the transformed message being translated from the second protocol to a third protocol using a property class;
sending the translated message from the message bus to a synthetic environment server according to the property class; and
updating the synthetic environment using data included in the translated message, wherein the synthetic environment is updated in substantially real-time.

29. A computer program product embodied in a tangible non-transitory computer readable medium and comprising computer instructions for:
generating a message at a synthetic environment server indicating occurrence of an event within a synthetic environment;

sending the message from the synthetic environment server to a message bus, the message being formatted according to a property class;

processing the message at the message bus, the message being translated into a translated message using the property class, wherein the translated message is formatted according to a web protocol;

sending the translated message from the message bus to a web application server;

processing the translated message at the web application server, the web application server being configured to adapt the translated message for data transmission to a web client; and sending the translated message, after processing by the web application server, to the web client, wherein data included in the translated message is used to update the web client in substantially real-time.

* * * * *